(12) United States Patent
Kumra et al.

(10) Patent No.: US 11,473,792 B2
(45) Date of Patent: Oct. 18, 2022

(54) TEMPERATURE-REGULATING FAN

(71) Applicant: Jmatek (Zhongshan) Ltd., Zhongshan (CN)

(72) Inventors: Naresh Kumra, Zhongshan (CN); Bo Ge, Zhongshan (CN); Yi Pu, Zhongshan (CN); Huoxi Zhou, Zhongshan (CN)

(73) Assignee: Jmatek (Zhongshan) Ltd., Zhongshan (CN)

( * ) Notice: Subject to any disclaimer, the term of this patent is extended or adjusted under 35 U.S.C. 154(b) by 389 days.

(21) Appl. No.: 16/686,557

(22) Filed: Nov. 18, 2019

(65) Prior Publication Data

US 2020/0208853 A1 Jul. 2, 2020

(51) Int. Cl.
*F24F 5/00* (2006.01)
*F24F 3/14* (2006.01)
*F24F 11/89* (2018.01)
*F24F 6/00* (2006.01)

(52) U.S. Cl.
CPC .............. *F24F 5/0035* (2013.01); *F24F 3/14* (2013.01); *F24F 6/00* (2013.01); *F24F 11/89* (2018.01); *F24F 2006/001* (2013.01)

(58) Field of Classification Search
CPC .... F24F 5/0035; F24F 3/14; F24F 6/00; F24F 2006/001
USPC ........................................................... 62/314
See application file for complete search history.

(56) References Cited

U.S. PATENT DOCUMENTS

| 6,418,728 | B1 * | 7/2002 | Monroe | ................ | F24F 5/0042 |
| | | | | | 62/3.2 |
| 6,434,963 | B1 * | 8/2002 | Urch | .................... | F24F 12/006 |
| | | | | | 62/93 |
| 9,731,478 | B2 * | 8/2017 | Schuld | .................. | B01F 23/215 |

\* cited by examiner

*Primary Examiner* — Steve S Tanenbaum
(74) *Attorney, Agent, or Firm* — Wang Law Firm, Inc.

(57) ABSTRACT

A temperature-regulating fan includes a housing in which a chamber is formed, wherein the housing is provided with an air inlet and an air outlet communicated with the chamber, and an air flow passage is formed between the air inlet and the air outlet; a wet curtain assembly comprising an evaporation unit provided in the air flow passage; and an air flow driving assembly configured to drive the air flow entering through the air inlet to the air outlet to be blown out through the air flow passage. The temperature-regulating fan of the present application has high cooling and heating efficiency, and has a good market application prospect.

15 Claims, 10 Drawing Sheets

TEMPERATURE-REGULATING FAN

TECHNICAL FIELD

The present application relates to the field of home appliance technology, and in particular, to a temperature-regulating fan.

BACKGROUND

With the improvement of people's living standards, traditional fans have gradually failed to meet people's daily needs, and fans with temperature regulating functions are gradually being widely used. The existing temperature-regulating fan is usually provided with a water tank, and a water pump is provided in the water tank. The water pump extracts normal-temperature water in the water tank and transports water to the upper part of the water curtain. Heat is absorbed by evaporation through the water curtain to reduce the temperature of the ambient air. The motor then drives wind wheels to rotate to generate wind, and drives the cooled air to be blown out of the tank to achieve the purpose of cooling.

How to provide a temperature-regulating fan with higher temperature regulation efficiency is an urgent problem to be solved.

SUMMARY

In order to solve the above technical problem, we have proposed a temperature-regulating fan with higher temperature regulation efficiency, which specifically comprises:

a housing in which a chamber is formed, wherein the housing is provided with an air inlet and an air outlet communicated with the chamber, and an air flow passage is formed between the air inlet and the air outlet;

a wet curtain assembly comprising an evaporation unit provided in the air flow passage; and an air flow driving assembly configured to drive the air flow entering through the air inlet to the air outlet to be blown out through the air flow passage.

In one embodiment, at least part of the evaporation unit is made of a metal material; or the evaporation unit is made of a metal honeycomb paper; or the evaporation unit comprises metal honeycomb paper and papery honeycomb paper composited with each other.

In one embodiment, the metal honeycomb paper has a specific surface area larger than a specific surface area of the papery honeycomb paper; and/or the metal honeycomb paper is an aluminum honeycomb paper.

In one embodiment, the temperature-regulating fan further comprises a vortex refrigeration assembly, the vortex refrigeration assembly comprises a vortex refrigeration pipe, and the vortex refrigeration pipe at least controllably feeds the air flow blown by a cold end or a hot end into the air flow passage.

In one embodiment, the temperature-regulating fan further comprises an exhaust passage provided in cooperation with the vortex refrigeration pipe, wherein the exhaust passage is provided to feed the air flow blown by one of the cold end or a hot end of the vortex refrigeration pipe into the housing when another of the cold end or a hot end of the vortex refrigeration pipe feeds the blown air flow into the air flow passage; and/or the vortex refrigeration assembly further comprises an air compressor in gaseous communication with the vortex refrigeration pipe, and the air compressor is configured to provide compressed air of the vortex refrigeration pipe.

In one embodiment, the wet curtain assembly further comprises a water tank, a water pump and a first liquid dispenser connected by a pipeline, and the water pump controllably sprays the water stored in the water tank to the evaporation unit through the first liquid dispenser.

In one embodiment, the temperature-regulating fan further comprises a temperature controlling assembly, and the temperature controlling assembly cooperates with the water tank for regulating the temperature of water stored in the water tank.

In one embodiment, the temperature controlling assembly comprises a semiconductor refrigerator, wherein the semiconductor refrigerator is controllably configured such that its hot end cooperates with the water tank to heat water stored in the water tank; and/or the semiconductor refrigerator is controllably configured such that its cold end cooperates with the water tank to cool water stored in the water tank.

In one embodiment, the temperature controlling assembly further comprises an electric heating element, wherein the electric heating element is configured to cooperate with the water tank to heat water stored in the water tank.

In one embodiment, the temperature controlling assembly comprises a first heat exchanger provided in the water tank, a second heat exchanger provided outside the water tank, and a compressor communicated with the first heat exchanger and the second heat exchanger by a pipeline, wherein the flow direction of the refrigerant flowing through the first heat exchanger and the second heat exchanger is reversible.

In one embodiment, the temperature-regulating fan further comprises a four-way valve cooperating with the compressor, wherein the four-way valve is configured to control the flow direction of the refrigerant flowing through the first heat exchanger and the second heat exchanger; and/or, the temperature-regulating fan further comprising a throttling element, wherein the refrigerant condensed by the second heat exchanger is controllable by the throttling element to flow into the first heat exchanger when the temperature-regulating fan operates in a cooling mode.

In one embodiment, the temperature-regulating fan further comprises a heat exchanging assembly, wherein the heat exchanging assembly comprises a third heat exchanger, a fourth heat exchanger and a compressor communicated by a pipeline, the third heat exchanger is located in the air flow passage, the fourth heat exchanger is located outside the air flow passage, and the flow direction of the refrigerant in the pipeline of the heat exchanging assembly is reversible;

a first water collector cooperating with the third heat exchanger and a second water collector cooperating with the fourth heat exchanger, wherein the first water collector and the second water collector are communicated with the water tank.

In one embodiment, the heat exchanging assembly comprises a four-way valve provided in cooperation with the compressor, and the heat exchanging assembly controllably controls the flow direction of the refrigerant in the pipeline of the heat exchanging assembly through the four-way valve.

In one embodiment, the third heat exchanger and/or the fourth heat exchanger are a finned-pipe heat exchanger; or the third heat exchanger is a copper-pipe heat exchanger.

In one embodiment, the heat exchanging assembly further comprises a throttling element; wherein the refrigerant condensed by the fourth heat exchanger is controllable by the throttling element to flow into the third heat exchanger when the temperature-regulating fan operates in a cooling mode.

In one embodiment, the temperature-regulating fan further comprises an atomizing assembly, which controllably atomizes and feeds the received water into the air flow passage.

In one embodiment, the temperature-regulating fan further comprises a second liquid dispenser connected to the water tank and the water pump by a pipeline, and the second liquid dispenser controllably delivers water stored in the water tank to the atomizing assembly.

In one embodiment, in the liquid pumping direction of the water pump, the second liquid dispenser is located upstream of the first liquid dispenser, and the second liquid dispenser also controllably delivers water stored in the water tank to the first liquid dispenser.

In one embodiment, the temperature-regulating fan further comprises a liquid collector cooperating with the evaporation unit and/or an atomizing assembly, the liquid collector is configured to collect the return water of the evaporation unit and/or the atomizing assembly, and the liquid collector is also in fluid communication with the water tank.

In one embodiment, the atomizing assembly atomizes and feeds the received water to the position of the air flow passage between the air outlet and the evaporation unit; and/or, the atomizing assembly atomizes and feeds the received water to the position of the air flow passage between the air inlet and the evaporation unit.

In one embodiment, the atomizing assembly comprises an atomizing nozzle; and/or an ultrasonic atomizer.

In one embodiment, the air flow driving assembly comprises a wind wheel and an air blower controllably driving the wind wheel, and the wind wheel is provided adjacent to the evaporation unit.

In one embodiment, the temperature-regulating fan further comprises a heat exchanging assembly, the heat exchanging assembly comprises a third heat exchanger, a fourth heat exchanger and a compressor communicated by a pipeline, wherein the flow direction of the refrigerant in the pipeline of the heat exchanging assembly is reversible; wherein the third heat exchanger is a casing heat exchanger, the pipeline connecting the water tank, the water pump and the first liquid dispenser is also connected to the casing of the casing heat exchanger; the pipeline connecting the third heat exchanger, the fourth heat exchanger and the compressor are also connected to the inner pipe of the casing heat exchanger.

The embodiment of the present application further provides a method for controlling a temperature-regulating fan, the method comprising:

acquiring a set target temperature and an operating mode, wherein the operating mode comprises a cooling mode and a heating mode;

controlling a corresponding end of the cold end and the hot end of the vortex refrigeration pipe to feed the blown air flow into the air flow passage according to the target temperature and the operating mode, and driving the air flow to the air outlet by the air flow driving assembly to be blown out.

In one embodiment, controlling a corresponding end of the cold end and the hot end of the vortex refrigeration pipe to feed the blown air flow into the air flow passage according to the target temperature and the operating mode specifically comprises:

if the operating mode is the cooling mode, controlling to feed the air flow blown from the cold end of the vortex refrigeration pipe to the air flow passage; and/or if the operating mode is the heating mode, controlling to feed the air flow blown from the hot end of the vortex refrigeration pipe to the air flow passage.

In one embodiment, controlling a corresponding end of the cold end and the hot end of the vortex refrigeration pipe to feed the blown air flow into the air flow passage according to the target temperature and the operating mode specifically comprises:

when the operating mode is the cooling mode, determining whether the maximum cooling capacity of the vortex refrigeration pipe is less than the cooling capacity required by the target temperature; if so, controlling the water pump to spray water stored in the water tank to the evaporation unit through the liquid dispenser.

In one embodiment, the method further comprises:

acquiring the set target humidity;

determining whether the set target humidity is greater than the air humidity of the current environment; if so, controlling the water pump to spray water stored in the water tank to the evaporation unit through the liquid dispenser.

The embodiment of the present application further provides a method for controlling a temperature-regulating fan, the method comprising:

acquiring a set target temperature and an operating mode, wherein the operating mode comprises a cooling mode and a heating mode;

controlling a hot end of the semiconductor refrigerator to cooperate with the water tank to heat water stored in the water tank according to the target temperature and the operation mode; or controlling a cold end of the semiconductor refrigerator to cooperate with the water tank to cool water stored in the water tank.

In one embodiment, the method comprises:

if the operating mode is the cooling mode, determining whether the difference between the set target temperature and the ambient temperature is greater than a preset value; if so, controlling a cold end of the semiconductor refrigerator to cooperate with the water tank to cool water stored in the water tank.

In one embodiment, the method comprises:

if the operating mode is the heating mode, controlling a hot end of the semiconductor refrigerator to cooperate with the water tank to heat water stored in the water tank.

The embodiment of the present application further provides a method for controlling a temperature-regulating fan, the method comprising:

acquiring a set operating mode, wherein the operating mode comprises a cooling mode and a heating mode;

controlling the flow direction of the refrigerant in the pipeline of the heat exchanging assembly according to the operating mode.

In one embodiment, in the cooling mode, the refrigerant in the pipeline of the heat exchanging assembly is controlled to flow through the second heat exchanger and the first heat exchanger in sequence after being compressed by the compressor.

In one embodiment, in the heating mode, the refrigerant in the pipeline of the heat exchanging assembly is controlled to flow through the first heat exchanger and the second heat exchanger in sequence after being compressed by the compressor.

The temperature-regulating fan of the present application achieves multiple improvement of the temperature regulation efficiency of the temperature-regulating fan by improving the wet curtain assembly, the vortex refrigeration assembly, the temperature controlling assembly, the atomizing assembly and the like, and has a good application prospect.

BRIEF DESCRIPTION OF THE DRAWINGS

In order to more clearly illustrate the technical solutions of the embodiments of the present application, the drawings used in the description of the embodiments will be briefly described below. It is obvious that the drawings in the following description are only some embodiments of the present application. Those skilled in the art can also obtain other drawings based on these drawings without paying any creative work.

DESCRIPTION OF THE EMBODIMENTS

The technical solutions in the embodiments of the present application are clearly and completely described in the following with reference to the accompanying drawings in the embodiments of the present application. It is obvious that the described embodiments are only some embodiments of the present application, rather than all embodiments. All other embodiments obtained by those skilled in the art based on the embodiments of the present application without paying any creative work fall within the scope of protection of the present application.

The specific embodiments of the present application will be further described in detail below with reference to the accompanying drawings.

Figure 1:
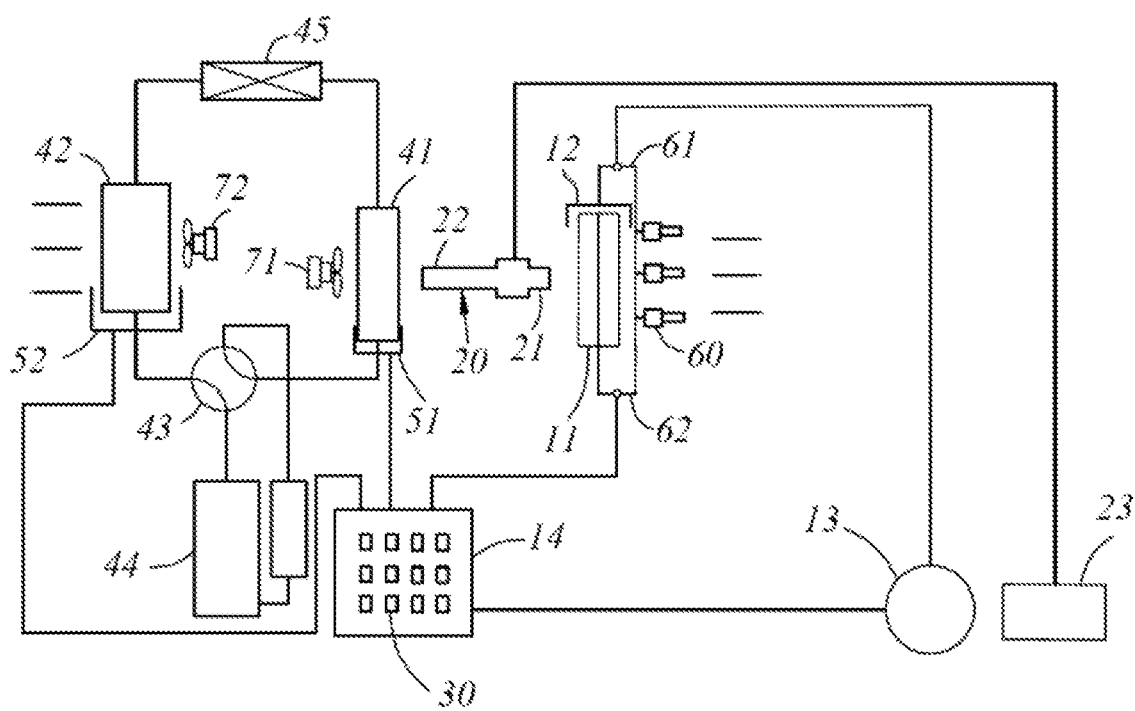
FIG. 1 is a schematic diagram of a functional module of a temperature-regulating fan according to an embodiment of the present application.

Referring to FIG. 1, a specific embodiment of the temperature-regulating fan 100 of the present application is described. In the present embodiment, the temperature-regulating fan 100 comprises a housing (not shown), a wet curtain assembly (not separately labeled), a vortex refrigeration assembly 20, a temperature controlling assembly 30, a heat exchanging assembly (not separately labeled), atomizing assembly 60, and an air flow driving assembly 71.

The housing is configured to substantially form an overall appearance of the temperature-regulating fan 100, and a physical structure comprising a control panel, a roller structure, a handle, and the like (the above-described structural diagram is not shown) may be provided as needed. The control panel may be connected with the circuit or the controlling assembly inside a temperature-regulating fan 100 for the operator to implement the function regulation or setting of the temperature-regulating fan 100. The function regulation or setting of the temperature-regulating fan 100 will be described in the following embodiments. Other selective physical structures on the housing are not described in detail since the gist of the present application is not involved.

A chamber is formed inside the housing for accommodating the wet curtain assembly, the vortex refrigeration assembly 20, the temperature controlling assembly 30, the heat exchanging assembly, the atomizing assembly 60, and the air flow driving assembly 71 described above. The housing is provided with an air inlet and an air outlet communicated with the chamber, and an air flow passage (not shown) is formed between the air inlet and the air outlet It should be noted that the air flow passage here is not a limitation formed on the physical structure, that is, the air flow passage does not have a strict separation or boundary with other spaces in the chamber. It only indicates that there is an air flow path in the chamber so that the outside air enters the chamber from the air inlet of the housing, and flows out of the chamber from the air outlet of the housing to form a complete air circulation.

The wet curtain assembly comprises an evaporation unit 11 provided in the air flow passage, and a water tank 14, a water pump 13 and a liquid dispenser 12 connected by a pipeline. The water pump 13 controllably sprays the water stored in the water tank 14 to the evaporation unit 11 through the liquid dispenser 12. The evaporation unit 11 generally has a very high heat exchanging efficiency. When the water sprayed thereon evaporates, it absorbs the heat of the ambient air, so that the ambient air is cooled, and the cooled air is fed out of the air outlet through the air flow passage, so as to further reduce the temperature of the outlet air.

At least part of the evaporation unit 11 is made of a metal material, and the metal material has a high heat exchanging efficiency, so that a relatively high heat exchanging efficiency can be provided. Specifically, the evaporation unit 11 may be made of metal honeycomb paper. The honeycomb paper has a porous honeycomb array arrangement structure, has a high specific surface area, and significantly increases the evaporation area, thereby further improving heat exchanging efficiency.

Figure 2:
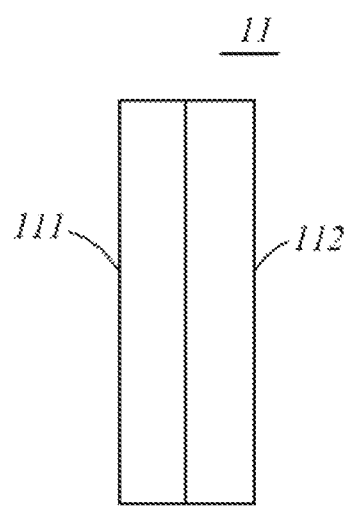
FIG. 2 to FIG. 4 are schematic diagrams illustrating the structure of different forms of an evaporation unit of a temperature-regulating fan according to an embodiment of the present application.
Figure 3:
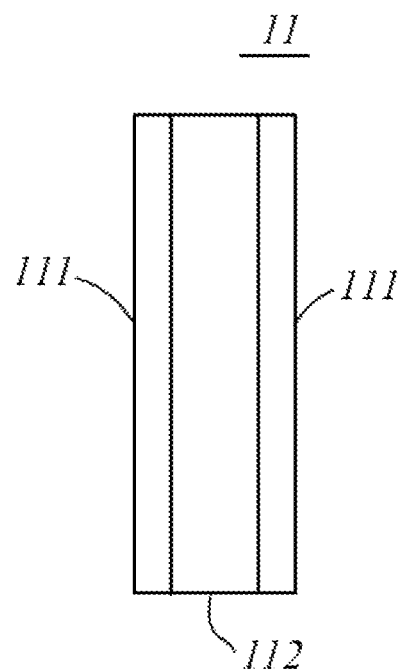
Figure 4:
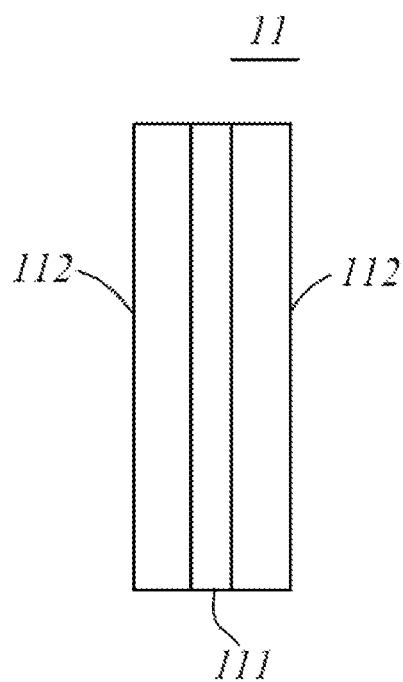

Referring to FIG. 2, in one embodiment, the evaporation unit 11 may further comprise metal honeycomb paper 111 and papery honeycomb paper 112 composited with each other. The composite layer number and the composite form of the metal honeycomb paper 111 and the papery honeycomb paper 112 may be selected according to actual conditions. The three-layer composite structure is taken as an example, and may be metal honeycomb paper 111, papery honeycomb paper 112, and metal honeycomb paper 111 (see FIG. 3) composited with each other sequentially; or, papery honeycomb paper 112, metal honeycomb paper 111, and papery honeycomb paper 112 composited with each other sequentially (as shown in FIG. 4).

In one embodiment, due to the operability in the processing process, the specific surface area of the metal honeycomb paper 111 is greater than that of the papery honeycomb paper 112, that is, the density of the honeycomb array arrangement structure on the metal honeycomb paper 111 is greater than that of the papery honeycomb paper 112 to provide the possibility of higher exchanging efficiency. Moreover, the material of the metal honeycomb paper 111 can be selected according to the design requirements, such as aluminum honeycomb paper, copper honeycomb paper, or alloy honeycomb paper; the shape of the honeycomb array unit on the honeycomb paper can also be made into a circle, an ellipse, a polygon, etc., as needed.

The position of the air flow driving assembly 71 can be appropriately arranged as needed, for example, between the evaporation unit 11 and the air inlet, and provided adjacent to the evaporation unit 11. When the temperature-regulating fan 100 is in operation, the air flow driving assembly 71 can drive the air entering from the air inlet to the air outlet through the air flow passage to be blown out. At the same time, the air is rapidly cooled when flowing through the evaporation unit 11, thereby realizing the function of regulating the temperature of the outlet air. The air flow driving assembly 71 comprises a wind wheel and an air blower controllably driving the wind wheel, and the wind wheel is provided adjacent to the evaporation unit 11. Of course, the air flow driving assembly 71 can also be replaced with other suitable forms, such as leafless fans and the like.

The vortex refrigeration assembly 20 comprises a vortex refrigeration pipe, and the vortex refrigeration pipe at least controllably feeds the air flow blown by the cold end 21 or the hot end 22 into the air flow passage. The number of vortex refrigeration pipes may be set to one or more as needed. The vortex refrigeration assembly 20 further comprises an air compressor 23 in gaseous communication with the vortex refrigeration pipe, and the air compressor 23 is configured to provide compressed air of the vortex refrigeration pipe. Cold air can be generated at one end (also known as the cold end 21, the minimum temperature can reach −46° C. on the premise of dry air), and hot air can be generated at the other end (also known as the hot end 22, the maximum temperature can reach 127° C.) only by inputting the compressed air of the universal pressure and the conversion of the vortex refrigeration pipe.

The air flow at the cold end 21 of the vortex refrigeration pipe can compensate for the lack of the assembly refrigeration efficiency of the evaporation unit 11, and the hot end 22 has the advantages of low energy efficiency and good safety compared with the conventional electric heating pipe or PTC heating material. In a specific structure, the vortex refrigeration pipe is consisted of a nozzle, a vortex chamber, a separation orifice plate, and pipes at a hot end and a cold end. The compressed air expands in the nozzle during operation and then enters the vortex refrigeration pipe in a tangential direction at a very high speed. When the air flow rotates at a high speed in the vortex refrigeration pipe, the air flow is separated into two parts of the air flow with unequal total temperature after vortex conversion. The temperature of the air flow at the central part is low, and the temperature of the air flow at the outer part is high. The ratio of the cold flow and the hot flow is adjusted so as to obtain an optimal cooling effect or heating effect.

The temperature-regulating fan 100 further comprises an exhaust passage (not shown) provided in cooperation with the vortex refrigeration pipe, wherein the exhaust passage is provided to feed the air flow blown by one of the cold end 21 or hot end 22 of the vortex refrigeration pipe into the housing when another of the cold end 21 or hot end 22 of the vortex refrigeration pipe feeds the blown air flow into the air flow passage.

In a specific arrangement, the housing may be provided with an opening and may be cooperated with one of the cold end 21 or the hot end 22 of the vortex refrigeration pipe to feed the air flow blown at the corresponding end from the housing. Alternatively, a physical ventilation pipeline may be provided in correspondence with the opening in the housing for correspondingly receiving the air flow blown by the cold end 21 or the hot end 22 of the vortex refrigeration pipe, so that the air flow is not dispersed in the chamber of the housing as much as possible so as to avoid influencing the temperature inside the chamber.

The corresponding method for controlling the temperature-regulating fan 100 comprises: first, acquiring a set target temperature and an operating mode, wherein the operating mode comprises a cooling mode and a heating mode; controlling a corresponding end of the cold end 21 and the hot end 22 of the vortex refrigeration pipe to feed the blown air flow into the air flow passage according to the target temperature and the operating mode, and driving the air flow to the air outlet by the air flow driving assembly 71 to be blown out.

Specifically, the method comprises: if the operating mode is the cooling mode, controlling to feed the air flow blown from the cold end 21 of the vortex refrigeration pipe to the air flow passage; and/or if the operating mode is the heating mode, controlling to feed the air flow blown from the hot end 22 of the vortex refrigeration pipe to the air flow passage. When the operating mode is the cooling mode, the method further comprises: determining whether the maximum cooling capacity of the vortex refrigeration pipe is less than the cooling capacity required by the target temperature; if so, controlling the water pump 13 to spray water stored in the water tank 14 to the evaporation unit 11 through the liquid dispenser 12 to improve the refrigeration efficiency.

The control method further comprises: acquiring the set target humidity; determining whether the set target humidity is greater than the air humidity of the current environment; if so, controlling the water pump 13 to spray water stored in the water tank 14 to the evaporation unit 11 through the liquid dispenser 12.

Through the cooperation of the vortex pipe, the wet curtain assembly, and the air flow driving assembly 71, an operating mode obtained by combining a plurality of hot and cold modes, a plurality of air volume and humidity can be realized. Some of these combined operating modes are exemplified again herein.

Cooling Mode:

1. when more amount of air volume and a greater cooling capacity are required, the air compressor 23, the water pump 13 and the air flow driving assembly 71 are all operated, the water pump 13 feeds water in the water tank 14 to the liquid dispenser 12 and uniformly sprays water on the evaporation unit 11, and the evaporation unit 11 absorbs the heat of the ambient air and lowers the temperature of the ambient air to obtain air with a slightly lower temperature; at the same time, the air compressor 23 feeds the compressed air to the vortex refrigeration pipe for separation, the low-temperature cold air is fed out from the cold end 21 and is mixed with air with a slightly lower temperature passing through the evaporation unit 11 to be blown out to achieve the purpose of cooling, and the high-temperature air separated by the vortex refrigeration pipe is blown out from the hot end 22 and fed from the housing.

2. when a large cooling capacity and a low amount of air volume are required, the water pump 13 and the air flow driving assembly 71 are not operated, the air compressor 23 is operated, the compressed air is fed to the vortex refrigeration pipe for separation, the low-temperature cold air is fed from the cold end 21 to achieve the purpose of cooling, and the high-temperature air separated by the vortex refrigeration pipe is blown out from the hot end 22 and fed from the housing.

When the air volume is insufficient, the air flow driving assembly 71 can be controlled to cooperate to start up to replenish the air volume.

3. when a large amount of air volume and a low cooling capacity are required, the air compressor 23 is not operated, the water pump 13 and the air flow driving assembly 71 are operated, the water pump 13 feeds the moisture in the water tank 14 to the liquid dispenser 12 and uniformly sprays the moisture on the evaporation unit 11, and the evaporation unit 11 absorbs the heat of the ambient air, lowers the temperature of the ambient air to obtain air with a slightly lower temperature, and feeds the air from the air outlet through the air flow driving assembly 71.

Heating Mode:

1. when a large amount of air volume and a great amount of heat are required, the air flow driving assembly 71 and the air compressor 23 are activated simultaneously, the water pump 13 is not activated, the air compressor 23 feeds the compressed air to the vortex refrigeration pipe for separation, the high-temperature humid air is fed from the hot end 22, enters the air flow passage, and is blown out from the air outlet through the air flow driving assembly 71, and the low-temperature air separated by the vortex refrigeration pipe is blown out from the cold end 21 and fed from the housing.

2. when a great amount of heat is required and there is no requirement for air volume, the air compressor 23 is activated, the water pump 13 is not activated, and the air flow driving assembly 71 selectively activates and operates the power as needed. The combined mode of the air compressor 23 and the water pump 13 will not be described herein.

3. when heating and humidity are required, the air compressor 23, the water pump 13 and the air flow driving assembly 71 are activated simultaneously, and the hot air flow fed from the hot end 22 of the vortex refrigeration pipe to the air flow passage is mixed with the moisture near the evaporation unit 11, and is fed from the air outlet together with the moisture by the air flow driving assembly 71.

The temperature controlling assembly 30 cooperates with the water tank 14 for regulating the temperature of the water stored in the water tank 14. By adjusting the temperature of the water stored in the water tank 14, the cooling and heating efficiency of the temperature-regulating fan 100 can be further increased. The temperature controlling assembly 30 herein comprises a semiconductor refrigerator. The semiconductor refrigerator is controllably configured such that its hot end cooperates with the water tank 14 to heat water stored in the water tank 14; and/or the semiconductor refrigerator is controllably configured such that its cold end cooperates with the water tank 14 to cool water stored in the water tank 14.

Figure 5:
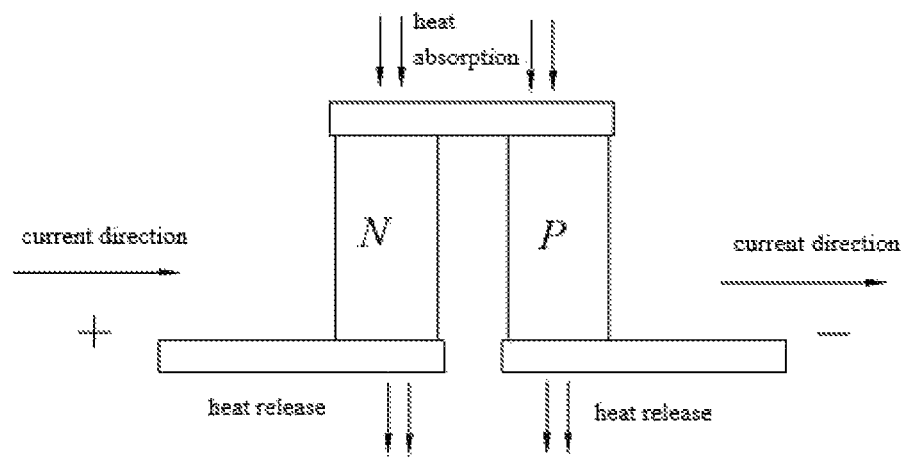
FIG. 5 is a schematic diagram illustrating the structure of a semiconductor chilling plate of a temperature-regulating fan according to an embodiment of the present application.

Since the water has a higher specific heat capacity, the temperature controlling assembly 30 may further comprise an electric heating element (not shown), which is configured to cooperate with the water tank 14 to assist in heating water stored in the water tank 14; the semiconductor refrigerator may comprise a plurality of semiconductor chilling plates. The semiconductor chilling plate generally comprises a plurality of N-type semiconductors and P-type semiconductors which are connected in series with each other. Taking FIG. 5 as an example, when an electric current passes, electrons in the N-type semiconductor move downward under the action of an electric field and are subjected to exothermic polymerization with positive charge of the power supply at the lower end, and the holes in the P-type semiconductor move downward under the action of the electric field and are subjected to exothermic polymerization with negative charge of the power supply at the lower end; at the same time, the electrons and the holes are separated at the upper end, and the heat is absorbed during the separation. As such, the semiconductor refrigerator has a cold end and a hot end opposite the cold end as a whole.

The corresponding method for controlling the temperature-regulating fan 100 comprises: first, acquiring a set target temperature and an operating mode, wherein the operating mode comprises a cooling mode and a heating mode; controlling the hot end of the semiconductor refrigerator to cooperate with the water tank 14 to heat water stored in the water tank 14 according to the target temperature and the operation mode; or controlling the cold end of the semiconductor refrigerator to cooperate with the water tank 14 to cool water stored in the water tank 14.

Specifically, the method comprises: if the operating mode is the cooling mode, the method comprises: determining whether the difference between the set target temperature and the ambient temperature is greater than a preset value; if so, controlling a cold end of the semiconductor refrigerator to cooperate with the water tank 14 to cool water stored in the water tank 14. Here, the semiconductor refrigerator is used to replenish the lack of the refrigeration efficiency of the evaporation unit 11. If the operating mode is the heating mode, the method comprises: controlling a hot end of the semiconductor refrigerator to cooperate with the water tank 14 to heat water stored in the water tank 14.

The heat exchanging assembly comprises a first heat exchanger 41, a second heat exchanger 42 and a compressor 44 communicated by a pipeline. The first heat exchanger 41 is located in the air flow passage, and the second heat exchanger 42 is located outside the air flow passage, wherein the flow direction of the refrigerant in the pipeline of the heat exchanging assembly is reversible. The first heat exchanger 41 is cooperated with the first water collector 51, and the second heat exchanger 42 is cooperated with the second water collector 52. The first water collector 51 and the second water collector 52 are connected to the water tank 14.

By controlling the flow direction of the refrigerant in the pipeline of the heat exchanging assembly, it can be determined that one of the first heat exchanger 41 and the second heat exchanger 42 functions as condensation, and the other of them functions as evaporation, thereby controlling the first heat exchanger 41 located in the air flow passage to cool/heat the ambient air.

Specifically, the heat exchanging assembly comprises a four-way valve 43 provided in cooperation with the compressor 44, and the heat exchanging assembly controllably controls the flow direction of the refrigerant in the pipeline of the heat exchanging assembly through the four-way valve 43. The heat exchanging assembly further comprises a throttling element; wherein the refrigerant condensed by the second heat exchanger 42 is controllable by the throttling element 45 to flow into the third heat exchanger 41 when the temperature-regulating fan 100 operates in a cooling mode. The throttling element 45 herein may be a throttle valve. When a refrigerant passes through the throttling element 45, the flow cross-sectional area is suddenly reduced, so that the flow rate of the refrigerant becomes large, so that the pressure and temperature are lowered, and the high-temperature high-pressure refrigerant is controllably throttled by the throttling element 45 into a low-temperature low-pressure refrigerant.

The form of the first heat exchanger 41 and the second heat exchanger 42 may be selected as needed, and exemplarily, may be a finned-pipe heat exchanger. Moreover, the air flow driving assembly 71 and the air flow driving assembly 72 may also be exemplarily used to cooperate with the first heat exchanger 41 and the second heat exchanger 42, respectively, to improve heat exchanging efficiency.

The corresponding controlling method comprises: first, acquiring a set target temperature and an operating mode, wherein the operating mode comprises a cooling mode and a heating mode; and controlling the flow direction of the refrigerant in the pipeline of the heat exchanging assembly according to the operating mode. In the cooling mode, the refrigerant in the pipeline of the heat exchanging assembly is controlled to flow through the second heat exchanger 42 and the first heat exchanger 41 in sequence after being compressed by the compressor 44; in the heating mode, the refrigerant in the pipeline of the heat exchanging assembly is controlled to flow through the first heat exchanger 41 and the second heat exchanger 42 in sequence after being compressed by the compressor 44.

When the temperature-regulating fan 100 is operating in the cooling mode, the refrigerant is compressed in the compressor 44 and is condensed in the second heat exchanger 42. After being throttled by the throttling element, the refrigerant enters the first heat exchanger 41 to exchange heat with the air, so that the air around the first heat exchanger 41 is cooled. After the heat exchange is completed, the refrigerant enters the compressor 44 again to form a circulation. During this process, since the refrigerant lowers the temperature of the first heat exchanger 41 to be lower than the air dew point temperature when evaporating and exchanging heat in the first heat exchanger 41, the water vapor in the air condenses on the surface of the first heat exchanger 41, and condensed water is formed to flow back to the first water collector 51, and is recovered into the water tank 14 through the pipeline to replenish the water stored in the water tank 14. Moreover, since the temperature of the return water is low, the refrigeration efficiency of the temperature-regulating fan 100 can be further enhanced.

When the temperature-regulating fan 100 is operating in the heating mode, the refrigerant is compressed in the compressor 44 and condensed in the first heat exchanger 41 to exchange heat with the air surrounding the first heat exchanger 41, so that the air around the first heat exchange exchanger 41 is heated. After being throttled by the throttling element, the refrigerant enters the second heat exchanger 42 to evaporate. After the heat exchange is completed, the refrigerant enters the compressor 44 again to form a circulation. Similarly, during this process, since the second heat exchanger 42 acts as an evaporation function, condensed water is generated on the surface thereof, and is recovered into the water tank 14 through the second water collector 52 to replenish the water stored in the water tank 14.

In the cooling and heating modes, the water pump 13 can be selectively activated to increase the refrigeration efficiency in the cooling mode, improve the humidity of the outlet air in the heating mode, and improve the working efficiency and functional experience of the temperature-regulating fan 100.

Moreover, it can be seen that the temperature-regulating fan 100 of the present application can recover a part of condensed water in the air to replenish the water stored in the water tank 14, thereby extending the effective working time of the temperature-regulating fan 100, regardless of being in the cooling mode or the heating mode.

The atomizing assembly 60 controllably atomizes and feds the received water into the air flow passage. Here, the temperature-regulating fan 100 further comprises a liquid dispenser 61 connected to the water tank 14 and the water pump 13 by a pipeline, and the liquid dispenser 61 controllably conveys the water stored in the water tank 14 to the atomizing assembly 60. Further, in the liquid pumping direction of the water pump 13, the liquid dispenser 61 is located upstream of the liquid dispenser 12, and the liquid dispenser 61 also controllably conveys the water stored in the water tank 14 to the liquid dispenser 12.

The temperature-regulating fan 100 further comprises a third accumulator 62 that cooperates with the evaporation unit 11 and/or the atomizing assembly 60. The third liquid collector 62 is configured to collect the return water of the evaporation unit 11 and/or the atomizing assembly 60, and the third liquid collector 62 is also connected to the water tank 14.

The atomizing assembly 60 atomizes and feeds the received water into the position of the air flow passage between the air outlet and the evaporation unit 11, or the atomizing assembly 60 atomizes and feeds the received water into the position of the air flow passage between the air inlet and the evaporation unit 11. The atomizing assembly may specifically comprise an atomizing nozzle or an ultrasonic atomizer, and the number may be set as needed.

By means of the additional atomizing assembly 60, on the one hand, the atomized water droplets will absorb a part of the heat in the air and reduce the temperature of the outlet air; on the other hand, the atomized water droplets will also significantly increase the humidity of the air in the outlet air, improving outlet air experience and having a better comfort.

It should be understood that the manner of supplying liquid to the atomizing assembly 60 and the wet curtain assembly herein is merely exemplary. In some alternative embodiments, the temperature-regulating fan 100 may also comprise a first liquid supply path and a second liquid supply path which are connected with each other in parallel or series. The first liquid supply path is configured to supply liquid to the evaporation unit 11, and the second liquid supply path is configured to supply liquid to the atomizing unit 60 to achieve a similar function. As to the order of supply, the water stored in the water tank may be separately supplied to the evaporation unit 11 and the atomizing unit 60 at the same time, or the excess water after passing through the atomizing unit 60 first enters the evaporation unit 11 for evaporation, or the excess water after passing through the evaporation unit 11 enters the atomizing assembly 60 for atomization, etc. In actual applications, the specific structural arrangement can be performed as needed, which will not be described herein.

In the above embodiment, the control relating to the air flow driving assembly 71, the water pump 13, the atomizing assembly 60, the four-way valve 43, the air compressor 23, and the like may be realized by integration of a conventional control module, which may be an integrated circuit comprising a Micro Controller Unit (MCU). As is well known to those skilled in the art, the MCU can comprise a Central Processing Unit (CPU), a Read-Only Memory (ROM), a Random Access Memory (RAM), a timing module, an A/D converter, and several input/output ports. Of course, the control system can also adopt other forms of integrated circuits, such as Application Specific Integrated Circuits (ASICs) or Field-Programmable Gate Arrays (FPGAs).

It should be understood that in the above embodiments, the physical structure, the wet curtain assembly, the vortex refrigeration assembly 20, the temperature controlling assembly 30, the heat exchanging assembly, the atomizing assembly 60, the air flow driving assembly 71, and the like, of the temperature-regulating fan involved implement the corresponding functions in the form of a combination. Under this premise, the specific cooperation manners and relative positional relationships of the assemblies and the constituent units thereof can be specifically set as needed, and are not limited to one/some manners shown in the drawings or the embodiments.

In some specific embodiments, the temperature-regulating fan of the present application may also comprise, in part, rather than all, the various assemblies/structures mentioned in the above embodiments, thereby correspondingly implementing the functions of the required parts. Several specific embodiments are given below.

Embodiment 1

Figure 6:
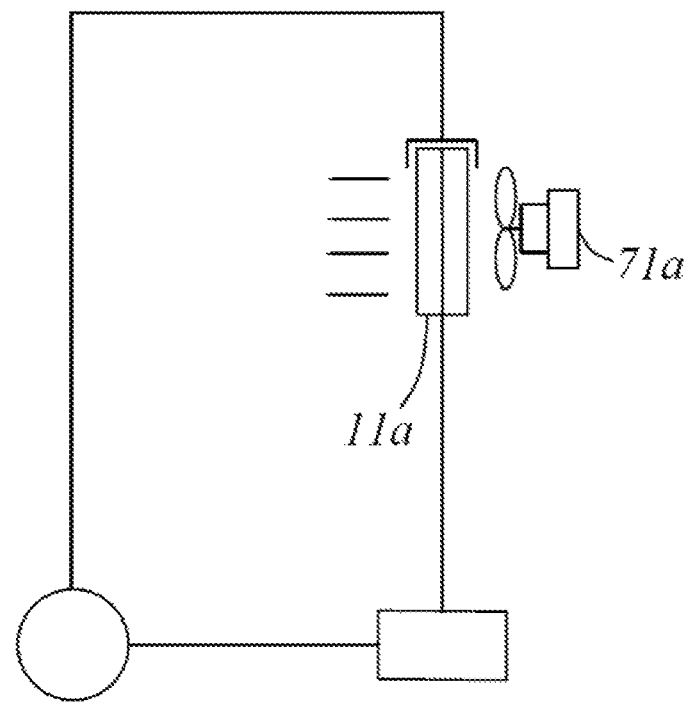
FIG. 6 to FIG. 14 are schematic diagrams of a functional module of a temperature-regulating fan according to different embodiments of the present application.

Referring to FIG. 6, the temperature-regulating fan 100a comprises a housing, a wet curtain assembly, and an air flow driving assembly 71a. At least part of the evaporation unit 11a of the wet curtain assembly is made of a metal material. Specifically, the evaporation unit 11a may be metal honeycomb paper. The honeycomb paper has a porous honeycomb array arrangement structure with a high specific surface area, significantly increasing the evaporation area, thereby further improving the heat exchanging efficiency.

Similarly, the evaporation unit may also be metal honeycomb paper and papery honeycomb paper composited with each other. The composite layer number and the composite form of the metal honeycomb paper and the papery honeycomb paper may be selected according to actual conditions. The three-layer composite structure is taken as an example, and may be metal honeycomb paper, papery honeycomb paper, and metal honeycomb paper composited with each other sequentially; or, papery honeycomb paper, metal honeycomb paper, and papery honeycomb paper composited with each other sequentially.

That is, the present embodiment mainly relates to the improvement of the portion of the evaporation unit 11a, and may not involve others.

Embodiment 2

Figure 7:
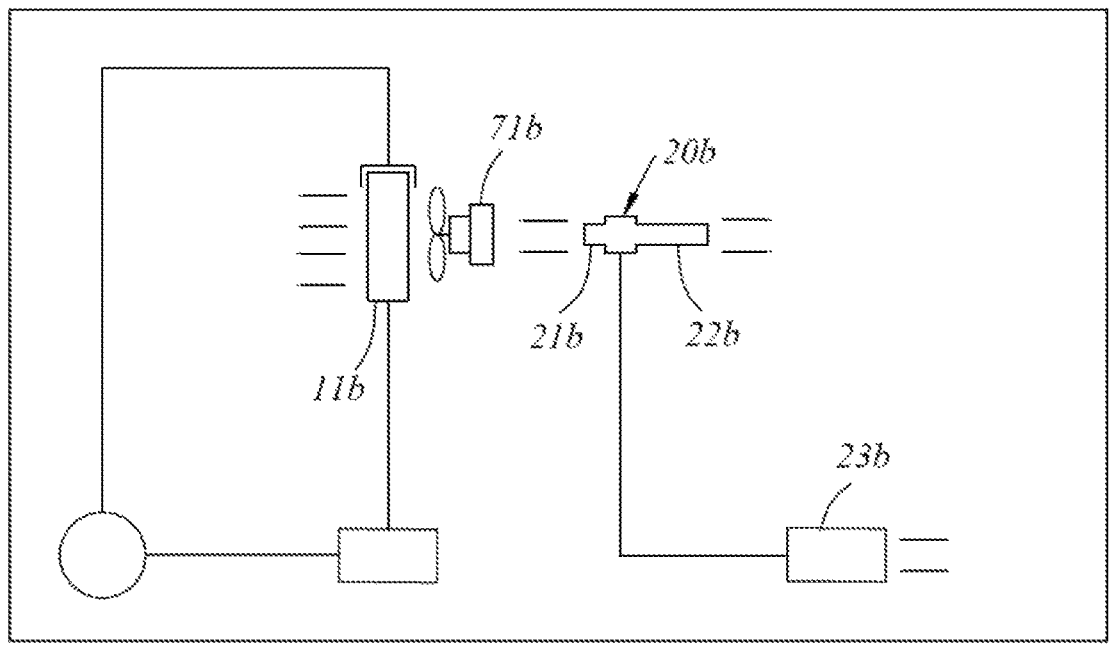
Figure 8:
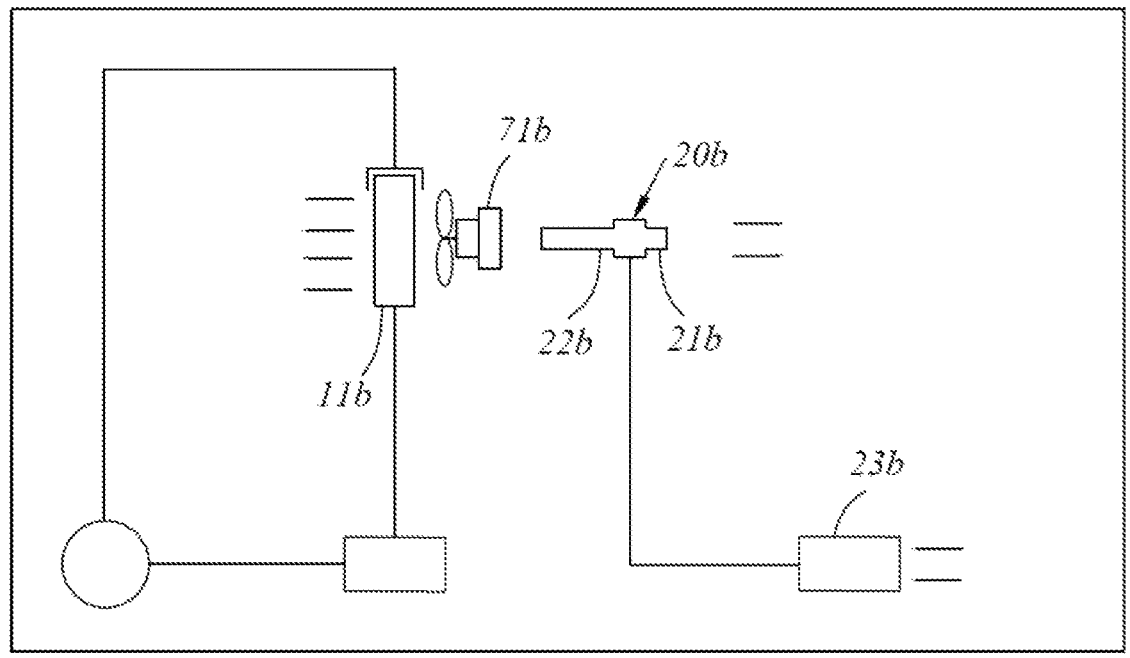

Referring to FIGS. 7 and 8, the temperature-regulating fan 100b comprises a housing, a wet curtain assembly, a vortex refrigeration assembly 20b, and an air flow driving assembly 71b. The vortex refrigeration assembly 20b comprises a vortex refrigeration pipe, and the vortex refrigeration pipe at least controllably feeds the air flow blown by the cold end 21b or the hot end 22b into the air flow passage. The number of vortex refrigeration pipes may be set to one or more as needed. The vortex refrigeration assembly 20b further comprises an air compressor 23b in gaseous communication with the vortex refrigeration pipe, and the air compressor is configured to provide compressed air of the vortex refrigeration pipe.

FIG. 7 and FIG. 8 are schematic diagrams of the cooperation of the different ends of the vortex refrigeration pipe with the exhaust passage. The air flow at the cold end 21b of the vortex refrigeration pipe can compensate for the lack of the assembly refrigeration efficiency of the evaporation unit 11b. The temperature-regulating fan 100b further comprises an exhaust passage provided in cooperation with the vortex refrigeration pipe, wherein the exhaust passage is provided to feed the air flow blown by one of the cold end 21 or hot end 22 of the vortex refrigeration pipe into the housing when another of the cold end 21 or hot end 22 of the vortex refrigeration pipe feeds the blown air flow into the air flow passage.

In a specific arrangement, the housing may be provided with an opening and may be cooperated with one of the cold end 21b or the hot end 22b of the vortex refrigeration pipe to feed the air flow blown at the corresponding end from the housing. Alternatively, a physical ventilation pipeline may be provided in correspondence with the opening in the housing for correspondingly receiving the air flow blown by the cold end 21b or the hot end 22b of the vortex refrigeration pipe, so that the air flow is not dispersed in the chamber of the housing as much as possible so as to avoid influencing the temperature inside the chamber.

That is, the present embodiment mainly relates to the additional vortex refrigeration assembly, and may not involve others.

Embodiment 3

Figure 9:
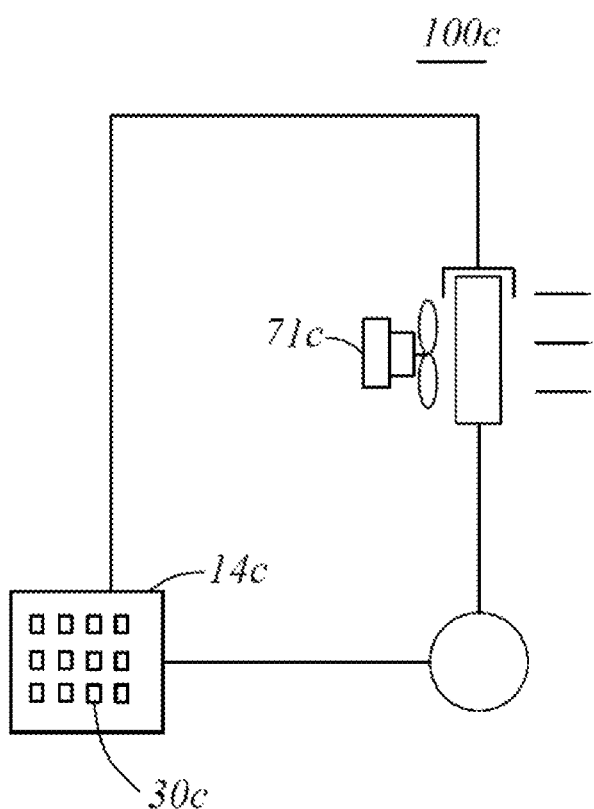

Referring to FIG. 9, the temperature-regulating fan 100c comprises a housing, a wet curtain assembly, a temperature controlling assembly 30c, and an air flow driving assembly 71c. The temperature controlling assembly 30c cooperates with the water tank 14c for regulating the temperature of the water stored in the water tank 14c. By adjusting the temperature of the water stored in the water tank 14c, the cooling and heating efficiency of the temperature-regulating fan 100c can be further increased. The temperature controlling assembly 30c herein comprises a semiconductor refrigerator. The semiconductor refrigerator is controllably configured such that its hot end cooperates with the water tank 14c to heat water stored in the water tank 14c; and/or the semiconductor refrigerator is controllably configured such that its cold end cooperates with the water tank to cool water stored in the water tank 14.

Figure 10:
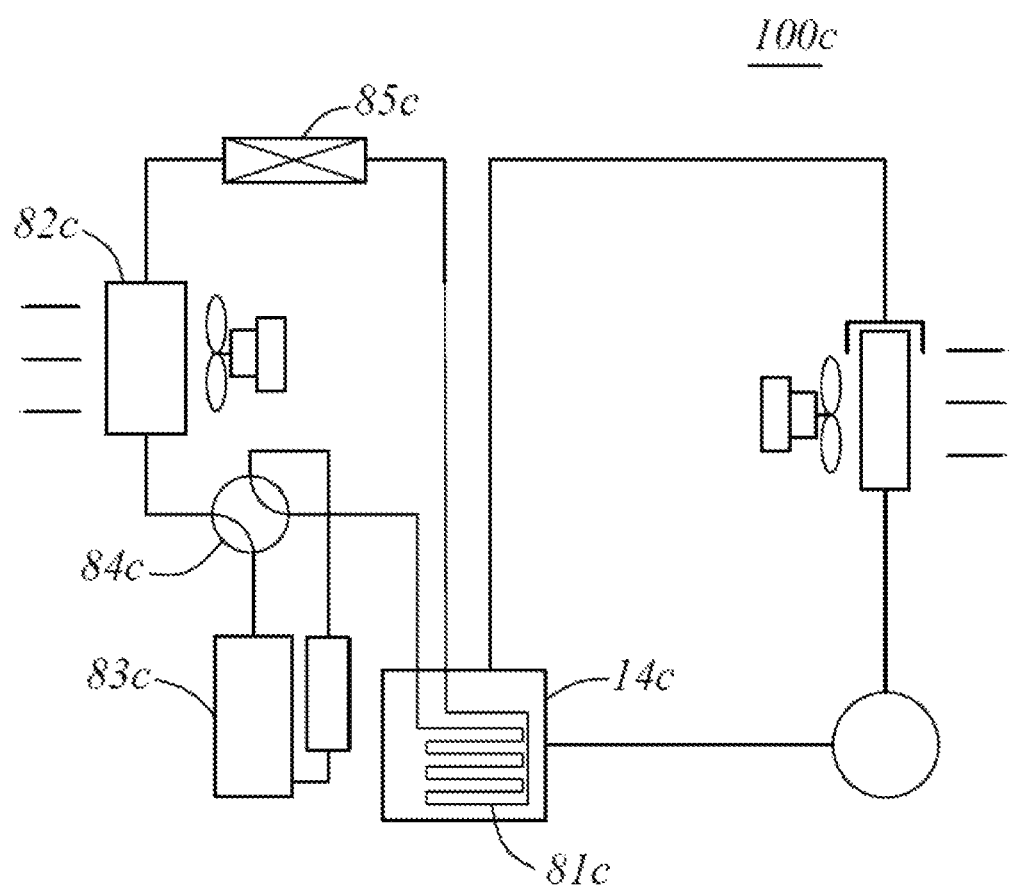

The specific implementation of the temperature controlling assembly is not limited to the semiconductor refrigerator. For example, referring to FIG. 10, the temperature controlling assembly may further comprise a first heat exchanger 81c provided in the water tank 14c, a second heat exchanger 82c provided outside the water tank 14c, and a compressor 83c communicated with the first heat exchanger 81c and the second heat exchanger 82c by a pipeline, wherein the flow direction of the refrigerant flowing through the first heat exchanger 81c and the second heat exchanger 82c is reversible.

Specifically, the temperature-regulating fan 100c further comprises a four-way valve 84c cooperating with the compressor 83c, wherein the four-way valve 84c is configured to control the flow direction of the refrigerant flowing through the first heat exchanger 81c and the second heat exchanger 82c. The temperature-regulating fan 100c further comprises a throttling element 85c, wherein the refrigerant condensed by the second heat exchanger 82c is controllable by the throttling element 85c to flow into the first heat exchanger 81c when the temperature-regulating fan 100c operates in a cooling mode.

In the cooling mode, the refrigerant compressed by the compressor 83c is first condensed in the second heat exchanger 82c, and then enters the first heat exchanger 81c under the control of the throttling element 85c to evaporate and exchange heat, thereby lowering the temperature of water stored in the water tank 14c; in the heating mode, on the contrary, the refrigerant compressed by the compressor 83c is first condensed in the first heat exchanger 81c, thereby raising the temperature of the water stored in the water tank 14c. The form of the first heat exchanger 81c and the second heat exchanger 82c herein may also be selected as needed, such as a finned-pipe heat exchanger and/or a pipe heat exchanger.

Similarly, the throttling element 85c also functions primarily to control and reduce the pressure and temperature of the refrigerant flowing therethrough, thereby cooperating with the cold/heat exchanging function of the first heat exchanger 81c and the second heat exchanger 82c, which will not be described here.

That is, the present embodiment mainly relates to the additional temperature controlling assembly 30c that cooperates with the water tank, and may not involve others.

Embodiment 4

Figure 11:
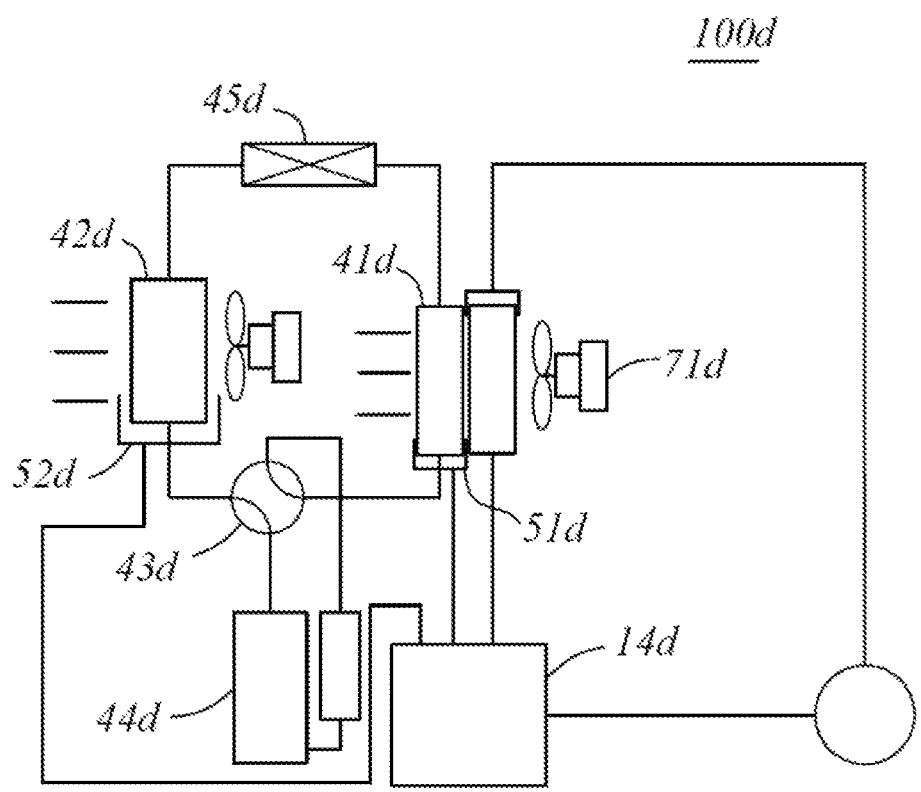

Referring to FIG. 11, the temperature-regulating fan 100d comprises a housing, a wet curtain assembly, a heat exchanging assembly, and an air flow driving assembly 71d. The heat exchanging assembly comprises a first heat exchanger 41d, a second heat exchanger 42d, and a compressor 44d communicated by a pipeline. The first heat exchanger 41d is located in the air flow passage, and the second heat exchanger 42d is located outside the air flow passage, wherein the flow direction of the refrigerant in the pipeline of the heat exchanging assembly is reversible. The first heat exchanger 41d is cooperated with the first water collector 51d, and the second heat exchanger 42d is cooperated with the second water collector 52d. The first water collector 51d and the second water collector 52d are connected to the water tank 14d.

By controlling the flow direction of the refrigerant in the pipeline of the heat exchanging assembly, it can be determined that one of the first heat exchanger 41d and the second heat exchanger 42d functions as condensation, and the other of them functions as evaporation, thereby controlling the first heat exchanger 41d located in the air flow passage to cool/heat the ambient air.

Specifically, the heat exchanging assembly comprises a four-way valve 43d provided in cooperation with the compressor 44d, and the heat exchanging assembly controllably controls the flow direction of the refrigerant in the pipeline by the four-way valve 43d. The heat exchanging assembly further comprises a throttling element 45d; wherein the refrigerant condensed by the second heat exchanger 42d is controllable by the throttling element 45d to flow into the first heat exchanger 41d when the temperature-regulating fan 100d operates in a cooling mode so as to evaporate and absorb heat in the first heat exchanger 41d to lower the temperature of the ambient air. The throttling element 45d herein may be a throttle valve.

The form of the first heat exchanger 41d and the second heat exchanger 42d may be selected as needed, and exemplarily, a finned-pipe heat exchanger may be employed.

That is, the present embodiment mainly relates to the additional heat exchanging assembly and the first water collector 51d and the second water collector 52d which are provided in cooperation, and may not involve others.

Figure 13:
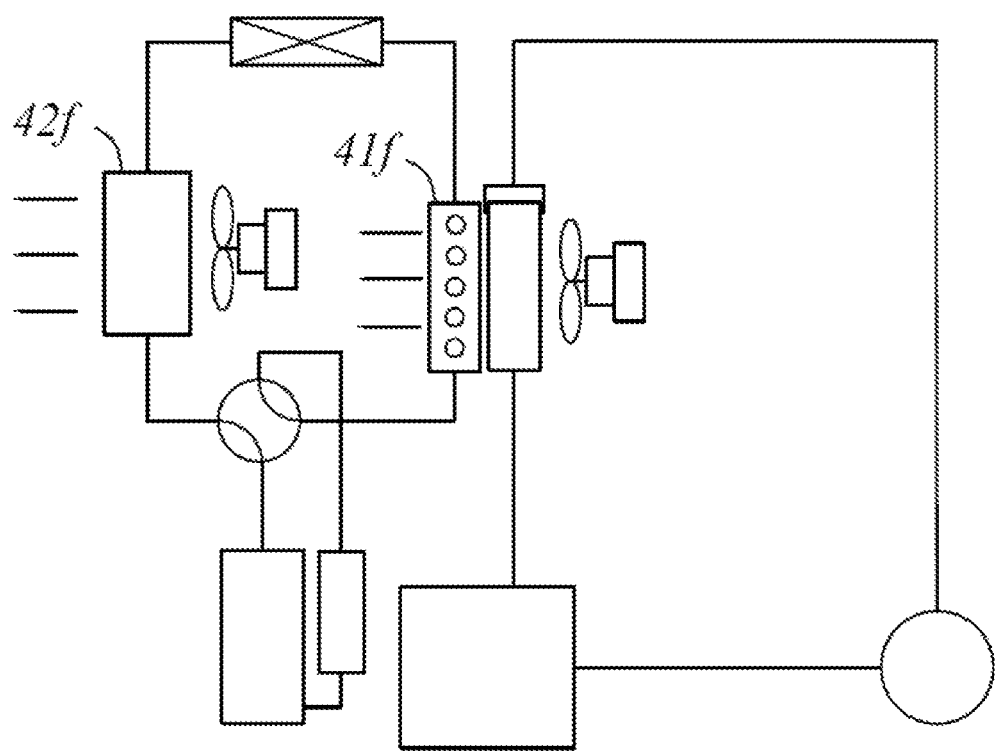

Of course, in an alternative example such as that shown in FIG. 13, the first heat exchanger 41f of the temperature-regulating fan 100f may also employ a copper-pipe heat exchanger, and the second heat exchanger may be a cooperated condenser 42f. Moreover, the first heat exchanger 41f and the second heat exchanger 42f may also be provided without a water collector that collects condensed water.

Embodiment 5

Figure 12:
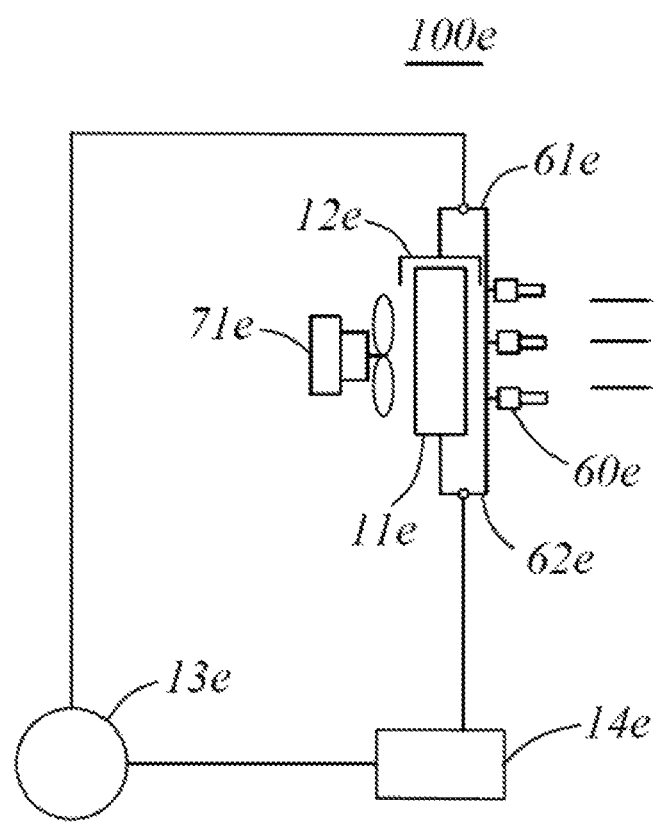

Referring to FIG. 12, the temperature-regulating fan 100e comprises a housing, a wet curtain assembly, an atomizing assembly 60e, and an air flow driving assembly 71e. The atomizing assembly 60e controllably atomizes and feds the received water into the air flow passage. Here, the temperature-regulating fan 100e further comprises a liquid dispenser 61e connected to the water tank 14e and the water pump 13e by a pipeline, and the liquid dispenser 61e controllably conveys the water stored in the water tank 14e to the atomizing assembly 60e. Further, in the liquid pumping direction of the water pump 13e, the liquid dispenser 61e is located upstream of the liquid dispenser 12e, and the liquid dispenser 61e also controllably conveys the water stored in the water tank 14e to the liquid dispenser 12e so that the evaporation unit 11e of the wet curtain assembly evaporates and exchanges heat.

The temperature-regulating fan 100e further comprises a liquid collector 62e that cooperates with the evaporation unit 11e and/or the atomizing assembly 60e. The liquid collector 62e is configured to collect the return water of the evaporation unit 11e and/or the atomizing assembly 60e, and the liquid collector 62e is also connected to the water tank.

The atomizing assembly 60e atomizes and feeds the received water into the position of the air flow passage between the air outlet and the evaporation unit 11e, or the atomizing assembly 60e atomizes and feeds the received water into the position of the air flow passage between the air inlet and the evaporation unit 11e. The atomizing assembly 60e may specifically comprise an atomizing nozzle or an ultrasonic atomizer, and the number may be set as needed.

That is, the present embodiment mainly relates to the additional atomizing assembly 60e, and may not involve others.

Embodiment 6

Figure 14:
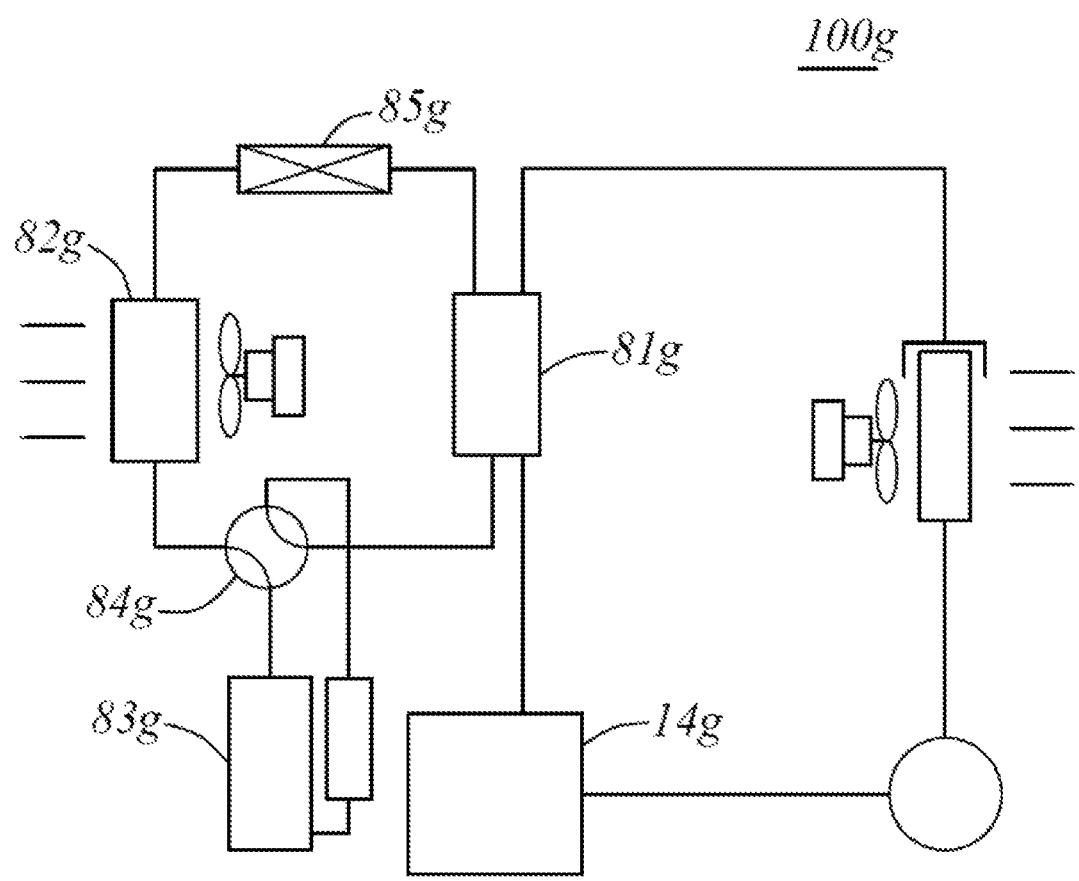

Referring to FIG. 14, the temperature-regulating fan 100g comprises a housing, a wet curtain assembly, a heat exchanging assembly, and an air flow driving assembly. The heat exchanging assembly comprises a third heat exchanger 81g, a fourth heat exchanger 82g, and a compressor 83g communicated by a pipeline, and the flow direction of the refrigerant in the pipeline of the heat exchanging assembly is reversible. The heat exchanging assembly is configured to cooperate with the water tank 14g to cool or heat the water pumped in the water tank 14g.

Specifically, the third heat exchanger 81g is a casing heat exchanger, the pipeline connecting the water tank 14g, the water pump and the first liquid dispenser is also connected to the casing of the casing heat exchanger; the pipeline connecting the third heat exchanger, the fourth heat exchanger 82g and the compressor 83g are also connected to the inner pipe of the casing heat exchanger. The temperature-regulating fan 100g further comprises a four-way valve 84g that cooperates with the compressor 83g for controlling the flow direction of the refrigerant flowing through the first heat exchanger 81g and the second heat exchanger 82g. The temperature-regulating fan 100g further comprises a throttling element 85g, and the refrigerant condensed by the second heat exchanger 82g is controllable by the throttling element 85g to flow into the first heat exchanger 81g when the temperature-regulating fan 100g operates in a cooling mode.

In the cooling mode, the refrigerant compressed by the compressor 83g is first condensed in the fourth heat exchanger 82g, and then enters the third heat exchanger 81g under the control of the throttling element 85g to evaporate and exchange heat, so that the water pumped in the water tank 14g is cooled at the third heat exchanger 81g; in the heating mode, on the contrary, the refrigerant compressed by the compressor 83g is first condensed in the third heat exchanger 81g, so that the water pumped in the water tank 14g is heated at the third heat exchanger 81g.

Similarly, the throttling element 85g also functions primarily to control and reduce the pressure and temperature of the refrigerant flowing therethrough, thereby cooperating with the cold/heat exchanging function of the third heat exchanger 81g and the fourth heat exchanger 82g, which will not be described here.

That is, the present embodiment mainly relates to the additional heat exchanging assembly that cooperates with the water tank, and may not involve others.

The above description is only a preferred embodiment of the present application. It should be noted that those skilled in the art can make various modifications and improvements, which fall the scope of protection of the present application, without departing from the inventive concept of the present application.

What is claimed is:

1. A temperature-regulating device, comprising:
    a fan;
    a housing in which a chamber is formed, wherein the housing is provided with an air inlet and an air outlet communicated with the chamber, and an air flow passage is formed between the air inlet and the air outlet;
    a wet curtain assembly comprising an evaporation unit provided in the air flow passage; and
    an air flow driving assembly configured to drive the air flow entering through the air inlet to the air outlet to be blown out through the air flow passage,
    wherein the temperature-regulating fan further comprises a vortex refrigeration assembly which includes a vortex refrigeration pipe, and the vortex refrigeration pipe at least controllably feeds the air flow blown by a cold end or a hot end into the air flow passage; and
    the temperature-regulating fan further comprising an exhaust passage provided in cooperation with the vortex refrigeration pipe, wherein the exhaust passage is provided to feed the air flow blown by one of the cold end or a hot end of the vortex refrigeration pipe into the housing when another of the cold end or a hot end of the vortex refrigeration pipe feeds the blown air flow into the air flow passage.

2. The temperature-regulating device according to claim 1, wherein the vortex refrigeration assembly further comprises an air compressor in gaseous communication with the vortex refrigeration pipe, and the air compressor is configured to provide compressed air of the vortex refrigeration pipe.

3. The temperature-regulating device according to claim 1, wherein the evaporation unit comprises metal honeycomb paper and papery honeycomb paper composited with each other.

4. The temperature-regulating device according to claim 3, wherein the metal honeycomb paper has a specific surface area larger than a specific surface area of the papery honeycomb paper.

5. The temperature-regulating device according to claim 1, wherein the wet curtain assembly further comprises a water tank, a water pump and a first liquid dispenser connected by a pipeline, and the water pump controllably sprays the water stored in the water tank to the evaporation unit through the first liquid dispenser.

6. The temperature-regulating device according to claim 5, wherein the temperature-regulating fan further comprises a temperature controlling assembly, and the temperature controlling assembly cooperates with the water tank for regulating the temperature of water stored in the water tank.

7. The temperature-regulating device according to claim 6, wherein the temperature controlling assembly comprises a semiconductor refrigerator;
    wherein the semiconductor refrigerator is controllably configured such that its hot end cooperates with the water tank to heat water stored in the water tank; and the semiconductor refrigerator is controllably configured such that its cold end cooperates with the water tank to cool water stored in the water tank.

8. The temperature-regulating device according to claim 6, wherein the temperature controlling assembly comprises a first heat exchanger provided in the water tank, a second heat exchanger provided outside the water tank, and a compressor communicated with the first heat exchanger and the second heat exchanger by a pipeline, wherein the flow direction of the refrigerant flowing through the first heat exchanger and the second heat exchanger is reversible.

9. The temperature-regulating device according to claim 8, further comprising a four-way valve cooperating with the compressor, wherein the four-way valve is configured to control the flow direction of the refrigerant flowing through the first heat exchanger and the second heat exchanger.

10. The temperature-regulating device according to claim 8, further comprising a throttling element, wherein the refrigerant condensed by the second heat exchanger is controllable by the throttling element to flow into the first heat exchanger when the temperature-regulating fan operates in a cooling mode.

11. The temperature-regulating device according to claim 5, wherein the temperature-regulating fan further comprises an atomizing assembly, which controllably atomizes and feeds the received water into the air flow passage.

12. The temperature-regulating device according to claim 11, wherein the temperature-regulating fan further comprises a liquid collector cooperating with the evaporation unit and the atomizing assembly, the liquid collector is configured to collect the return water of the evaporation unit and the atomizing assembly, and the liquid collector is also in fluid communication with the water tank.

13. The temperature-regulating device according to claim 11, wherein the atomizing assembly atomizes and feeds the received water to the position of the air flow passage between the air outlet and the evaporation unit; and, the atomizing assembly atomizes and feeds the received water to the position of the air flow passage between the air inlet and the evaporation unit.

14. The temperature-regulating device according to claim 11, wherein the temperature-regulating fan further comprises a second liquid dispenser connected to the water tank and the water pump by a pipeline, and the second liquid dispenser controllably delivers water stored in the water tank to the atomizing assembly.

15. The temperature-regulating device according to claim 14, wherein in the liquid pumping direction of the water pump, the second liquid dispenser is located upstream of the first liquid dispenser, and the second liquid dispenser also controllably delivers water stored in the water tank to the first liquid dispenser.

* * * * *